J. W. KING.
DEHORNING IMPLEMENT.
APPLICATION FILED NOV. 28, 1916.
1,239,016.
Patented Sept. 4, 1917.
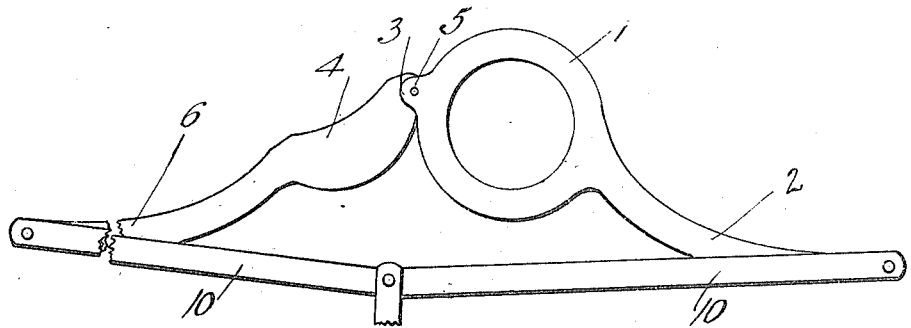
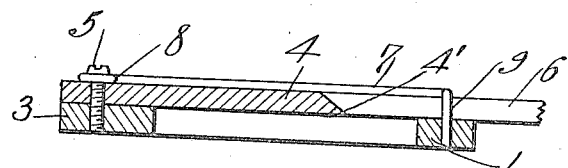
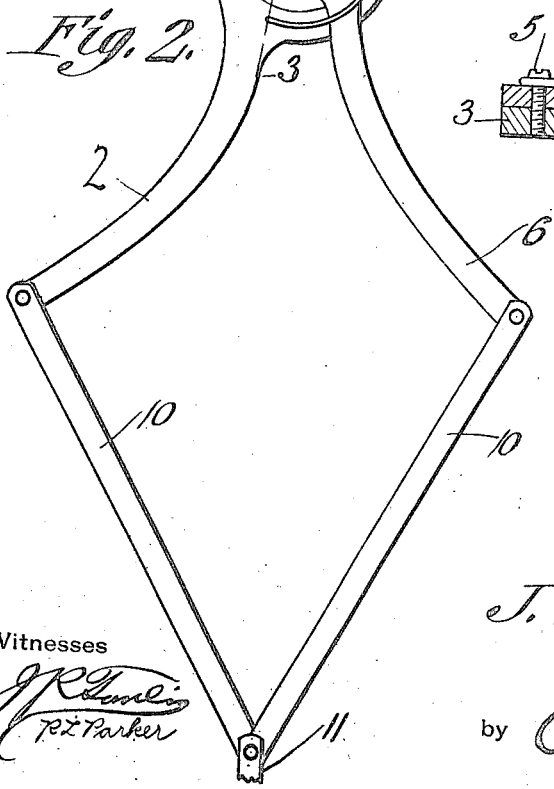
J. W. King, Inventor ature of the Letters Patent.

UNITED STATES PATENT OFFICE.

JOHN W. KING, OF ALPHA, IDAHO.

DEHORNING IMPLEMENT.

1,239,016. Specification of Letters Patent. Patented Sept. 4, 1917.

Application filed November 28, 1916. Serial No. 133,915.

*To all whom it may concern:*

Be it known that I, JOHN W. KING, a citizen of the United States, residing at Alpha, in the county of Boise and State of Idaho, have invented a new and useful Dehorning Implement, of which the following is a specification.

The present invention appertains to dehorning implements, and aims to provide a novel and improved yet extremely simple, inexpensive, practical and efficient dehorning device embodying a novel assemblage of the component elements to enhance the utility thereof.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, whereby:—

Figure 1 is a plan view of the implement in position to be applied to the horn.

Fig. 2 is an opposite plan view of the implement showing the parts in position as when completing the cut.

Fig. 3 is an enlarged section taken on the line 3—3 of Fig. 2.

The implement includes a flat ring 1 constructed of suitable metal, and adapted to be placed readily over the horn of the animal. The ring 1 is provided with an arm 2 projecting therefrom in the plane thereof, and the outer edge of the ring 1 is provided opposite the arm 2 with an outstanding ear 3. A crescent- or segmental-shaped cutter or shear blade 4 has one end overlapping one side of the ear 3 and pivoted thereto by means of a screw 5 engaged loosely through said end of the cutter 4 and threaded into the ear 3. The opposite end of the cutter 4 has an arm 6 projecting therefrom away from the pivoted end of said cutter. The cutter 4 has the curved sharp cutting edge 4' movable across the opening of the ring 1 for cutting or shearing off the horn, it being noted that when the arms or levers 2 and 6 are swung toward one another, the cutter 4 in moving across the opening of the ring 1 is adapted to cut off the horn without crushing it, and with a draw cut, the ring 1 being rotatable around the horn.

As a means for moving the cutter 4 against the side or face of the ring 1, an arcuate wire guide 7 is provided, the same being disposed adjacent to and spaced from one side of the ring 1 between the outer and inner edges thereof, and the cutter 4 being movable snugly between the ring 1 and guide 7. One end of the guide 7 has an eye 8 embracing the screw 5 under the head thereof, and the other end of said guide has a finger 9 extending at an angle therefrom and engaged within the ring 1 adjacent to the arm 2. There is therefore an arcuate slot between the ring 1 and guide 7 in which the cutter 4 and arm 6 are movable, the guide 7 holding the cutter 4 against the ring 1 to provide an effective shearing action.

As a convenient means for forcibly swinging the arms 2 and 6 toward one another to complete the cut, toggle links 10 have their remote ends pivoted to the ends of the arms 2 and 6, and a bar or shank 11 has one end pivoted to the joint of the toggle links 10, and is provided at its other free end with a suitable handle 12, which may be of any desired construction. The handle 11 can be folded against either of the toggle links 10, in order that the device can be compactly carried or stored.

In use, when the toggle links 10 are moved toward a straight line position, the cutter 4 is removed from the ring 1, and the ring can be readily placed over the horn. Then, by pulling the bar or handle member 11, the toggle links are pulled away from the ring 1 and swing toward one another, thereby pulling the arms 2 and 6 toward one another, so that the cutter 4 moves across the opening of the ring 1 to sever the horn. In this manner, the implement can be manipulated easily and effectively.

Having thus described the invention, what is claimed as new is:

An implement of the character described embodying a ring having an arm extending therefrom, a pivot element carried by the ring opposite to said arm and extending from one side of said ring, a cutter pivotally engaging said pivot element at the outer extremity of the cutter and movable along said side of the ring, and an arcuate wire guide at said side of the ring having one end bent into an eye embracing said pivot element and having its other end bent at an angle toward and engaging within said ring adjacent to said arm.

In testimony that I claim the foregoing as my own, I have hereto affixed my signature in the presence of two witnesses.

JOHN W. KING.

Witnesses:
 VALETTA KING,
 WADE BACON.